(12) United States Patent
Francis et al.

(10) Patent No.: US 7,166,248 B2
(45) Date of Patent: Jan. 23, 2007

(54) REDUCED VOC EMISSION ALKENYL AROMATIC POLYMER FOAMS AND PROCESSES

(75) Inventors: Gary A. Francis, Canandaigua, NY (US); Wen P. Wu, Pittsford, NY (US)

(73) Assignee: Pactiv Corporation, Lake Forest, IL (US)

( * ) Notice: Subject to any disclaimer, the term of this patent is extended or adjusted under 35 U.S.C. 154(b) by 42 days.

(21) Appl. No.: 10/336,345

(22) Filed: Jan. 3, 2003

(65) Prior Publication Data

US 2004/0132844 A1 Jul. 8, 2004

(51) Int. Cl.
B29C 44/20 (2006.01)
(52) U.S. Cl. .......................... 264/50; 264/53; 264/321; 264/DIG. 5; 521/79
(58) Field of Classification Search .................. 264/50, 264/53, DIG. 5, 321; 521/79
See application file for complete search history.

(56) References Cited

U.S. PATENT DOCUMENTS

| | | | |
|---|---|---|---|
| 3,431,164 A | 3/1969 | Gilbert | 161/161 |
| 3,432,447 A | 3/1969 | Patterson et al. | 260/2.5 |
| 3,548,795 A | 12/1970 | Howland | 123/119 |
| 3,637,458 A | 1/1972 | Parrish | 161/160 |
| 3,644,230 A | 2/1972 | Cronin | 260/2.5 |
| 3,863,000 A | 1/1975 | Kasai et al. | 264/45.5 |
| 4,011,357 A | 3/1977 | Haase | 428/215 |
| 4,101,467 A | 7/1978 | Park et al. | 521/79 |
| 4,129,530 A | 12/1978 | Park et al. | 521/79 |
| 4,146,267 A | 3/1979 | Mori et al. | 297/367 |
| 4,165,413 A | 8/1979 | Sefton et al. | 521/128 |
| 4,198,363 A | 4/1980 | Noel | 264/45.9 |
| 4,214,054 A | 7/1980 | Watanabe et al. | 521/95 |
| 4,217,319 A | 8/1980 | Komori | 264/53 |

(Continued)

FOREIGN PATENT DOCUMENTS

AU 52724/79 5/1980

(Continued)

OTHER PUBLICATIONS

PCT Search Report for International Application No. PCT/US03/40810 dated Jun. 18, 2004 (2 pages).

(Continued)

*Primary Examiner*—Allan R. Kuhns
(74) *Attorney, Agent, or Firm*—Baker Botts L.L.P.

(57) ABSTRACT

A method for producing an alkenyl aromatic polymer foam structure that comprises melting at least one alkenyl aromatic polymer resin. An effective amount of blowing agent mixture is dissolved in the at least one alkenyl aromatic polymer. The blowing agent mixture comprises at least one VOC blowing agent and acetone. The majority by mole percent of the VOC blowing agent is selected from n-butane, iso-butane, propane and combinations thereof. An extrudate is formed comprising the at least one alkenyl aromatic polymer resin, the at least one VOC blowing agent, and acetone. The extrudate comprises less than about 2.7 wt. % of the at least one VOC blowing agent. The extrudate is transferred to an expansion zone and permitted to expand to produce the foam structure. The foam structure has an extruded density less than about 7 lbs/ft$^3$ and a basis weight of less than about 20 grams per 100 in$^2$.

42 Claims, 1 Drawing Sheet

U.S. PATENT DOCUMENTS

| | | | |
|---|---|---|---|
| 4,255,372 A | 3/1981 | Kühnel et al. | 264/54 |
| 4,289,857 A | 9/1981 | Hoki et al. | 521/85 |
| 4,323,528 A | 4/1982 | Collins | 264/53 |
| 4,331,779 A | 5/1982 | Park | 521/134 |
| 4,343,913 A | 8/1982 | Watanabe et al. | 521/94 |
| 4,344,710 A | 8/1982 | Johnson et al. | 366/76 |
| 4,345,041 A | 8/1982 | Hoki et al. | 521/94 |
| 4,357,329 A | 11/1982 | Heywang et al. | 424/212 |
| 4,359,539 A | 11/1982 | Hoki et al. | 521/79 |
| 4,369,257 A | 1/1983 | Hoki et al. | 521/79 |
| 4,421,535 A | 12/1983 | Mehra | 62/17 |
| 4,424,287 A | 1/1984 | Johnson et al. | 521/74 |
| 4,446,986 A | 5/1984 | Bowen et al. | 220/307 |
| 4,456,704 A | 6/1984 | Fukumura et al. | 521/79 |
| 4,470,938 A | 9/1984 | Johnson | 264/50 |
| 4,485,059 A | 11/1984 | Krutchen et al. | 264/51 |
| 4,525,486 A | 6/1985 | Kobayashi et al. | 521/59 |
| 4,528,221 A | 7/1985 | Komatsuzaki et al. | 428/35 |
| 4,528,300 A | 7/1985 | Park | 521/79 |
| 4,569,950 A | 2/1986 | Hoshi et al. | 521/88 |
| 4,572,740 A | 2/1986 | Kretzschmann et al. | 106/122 |
| 4,640,933 A | 2/1987 | Park | 521/94 |
| 4,644,013 A | 2/1987 | Fujie et al. | 521/60 |
| 4,652,590 A | 3/1987 | Hoki et al. | 521/139 |
| 4,663,361 A | 5/1987 | Park | 521/94 |
| 4,694,027 A | 9/1987 | Park | 521/94 |
| 4,695,672 A | 9/1987 | Bunting | 585/867 |
| 4,806,293 A | 2/1989 | Akiyama et al. | 264/53 |
| 4,847,150 A | 7/1989 | Takeda | 428/318.8 |
| 4,882,108 A | 11/1989 | Nakajima et al. | 264/54 |
| 4,946,871 A | 8/1990 | Brichta et al. | 521/149 |
| 4,956,395 A | 9/1990 | Leduc | 521/79 |
| 4,959,397 A | 9/1990 | Brichta et al. | 521/96 |
| 5,059,376 A | 10/1991 | Pontiff et al. | 264/234 |
| 5,059,631 A | 10/1991 | Hovis et al. | 521/79 |
| 5,089,533 A | 2/1992 | Park | 521/79 |
| 5,098,631 A | 3/1992 | Pyzik et al. | 264/332 |
| 5,116,881 A | 5/1992 | Park et al. | |
| 5,124,097 A | 6/1992 | Malone | 264/51 |
| 5,149,579 A | 9/1992 | Park et al. | 428/213 |
| 5,180,751 A | 1/1993 | Park et al. | 521/51 |
| 5,182,308 A | 1/1993 | Voelker et al. | 521/79 |
| 5,225,451 A | 7/1993 | Rogers et al. | 521/94 |
| 5,286,429 A | 2/1994 | Blythe et al. | 264/51 |
| 5,286,757 A | 2/1994 | Smith et al. | 521/87 |
| 5,290,822 A | 3/1994 | Rogers et al. | 521/94 |
| 5,340,840 A | 8/1994 | Park et al. | 521/60 |
| 5,348,984 A | 9/1994 | Lee | 521/79 |
| 5,356,944 A | 10/1994 | Blythe et al. | 521/146 |
| 5,369,136 A | 11/1994 | Park et al. | 521/143 |
| 5,387,620 A | 2/1995 | Park et al. | 521/143 |
| 5,399,592 A | 3/1995 | Park | 521/79 |
| 5,405,883 A | 4/1995 | Park | 521/98 |
| 5,411,684 A | 5/1995 | Tusim et al. | 264/53 |
| 5,416,129 A | 5/1995 | Chaudhary et al. | 521/79 |
| 5,424,016 A | 6/1995 | Kolosowski | 264/156 |
| 5,428,093 A | 6/1995 | Lee | 524/317 |
| 5,453,454 A | 9/1995 | Alicke et al. | 521/79 |
| 5,460,818 A | 10/1995 | Park et al. | 426/415 |
| 5,462,974 A | 10/1995 | Lee | 521/79 |
| 5,527,573 A | 6/1996 | Park et al. | 428/314.8 |
| 5,554,661 A | 9/1996 | Chaudhary et al. | 521/97 |
| 5,556,920 A | 9/1996 | Tanaka et al. | 525/216 |
| 5,562,857 A | 10/1996 | Werner et al. | 252/67 |
| 5,576,094 A | 11/1996 | Callens et al. | 428/220 |
| 5,585,058 A | 12/1996 | Kolosowski | 264/156 |
| 5,667,928 A | 9/1997 | Thomas et al. | 430/134 |
| 5,672,294 A | 9/1997 | Lund et al. | 252/67 |
| 5,680,720 A | 10/1997 | Asazuma et al. | 40/564 |
| 5,698,144 A | 12/1997 | Wilkes et al. | 264/50 |
| 5,736,258 A | 4/1998 | Moy | 428/523 |
| 5,817,705 A | 10/1998 | Wilkes et al. | 521/79 |
| 5,876,813 A | 3/1999 | Bambara et al. | 428/36.5 |
| 5,905,098 A | 5/1999 | Wilkes et al. | 521/88 |
| 5,939,463 A | 8/1999 | Wu et al. | 521/97 |
| 6,069,183 A | 5/2000 | Wilkes et al. | 521/139 |
| 6,136,875 A | 10/2000 | Wu et al. | 521/97 |
| 6,225,363 B1 | 5/2001 | Wilkes et al. | 521/81 |

FOREIGN PATENT DOCUMENTS

| | | |
|---|---|---|
| DE | 42 01 763 | 1/1991 |
| EP | 0 647 673 A2 | 10/1986 |
| EP | 0 585 147 A1 | 7/1993 |
| JP | 5141149 | 11/1976 |
| JP | 3-63123 | 3/1991 |
| JP | 2623136 | 4/1997 |
| JP | 9231337 | 9/1997 |
| WO | 93/15132 | 8/1993 |

OTHER PUBLICATIONS

V. Firdaus, P.P. Tong, K.K. Cooper and Mobil Chemical Company, "*A Developmental HDPE Foam Resin*" Edison NJ, pp. 1931-1936 (1996).

Krutchen, et al., "Gas Chromatographic Determination of Residual Blowing Agents in Polystyrene Foams," *Proceeding SPE ANTEC '88* (1988), pp. 704-706.

General Purpose Polystyrene, *Encyclopedia of Polymer Science and Engineering*, J. Wiley & Sons, 2nd Edition, vol. 16, pp. 62-71 (1989).

Zwolinski et al., Extruded Polystyrene Foam With CFC/Carbon Dioxide Blowing Agents, *ANTEC 1986*, pp. 30-33 (1986).

FIGURE

REDUCED VOC EMISSION ALKENYL AROMATIC POLYMER FOAMS AND PROCESSES

FIELD OF THE INVENTION

The present invention relates generally to foam processes for producing an alkenyl aromatic polymer foam structure. More particularly, the present invention is directed to foam processes that produce an alkenyl aromatic polymer foam structure using reduced amounts of VOC blowing agent mixtures.

BACKGROUND OF THE INVENTION

Foam, such as an alkenyl aromatic polymer foam (e.g., polystyrene foam), may be made by combining a physical blowing agent with molten polystyrene resin under pressure and, after thorough mixing, extruding the combination through an appropriate die into a lower pressure atmosphere.

From about the 1950's to the present, physical blowing agents of choice have been halocarbons, hydrocarbons, or combinations thereof. Examples of these include commercially available halocarbon compositions, such as dichlorodifluoromethane and trichlorofluoromethane, and the $C_4$–$C_6$ hydrocarbons. Hydrocarbons with at least three carbon atoms are classified as volatile organic compounds (VOCs). These physical blowing agents, however, have disadvantages because they are released into the atmosphere during and after foam production and, thus, are a source of pollution.

In the past, carbon dioxide has been experimented with as a blowing agent for resins, such as polystyrene resins. Carbon dioxide has been listed as a blowing agent or as a co-blowing agent in the following: U.S. Pat. No. 3,431,164 to Gilbert et al., U.S. Pat. No. 4,198,363 to Noel, and U.S. Pat. No. 4,470,938 to Johnson. Carbon dioxide has a disadvantage of a very high foaming rate caused by its high volatility. A very high foaming rate results in a high degree of corrugation in the extruded sheet. Because of the high degree of corrugation, a lower amount of blowing agent is used as compared to using a conventional hydrocarbon or halocarbon blowing agent. When a lower amount of blowing agent is used, higher viscosities and a lower output rate are obtained.

Carbon dioxide has been used as a co-blowing agent or a diluent for hydrocarbon or halocarbon blowing agents. This is illustrated, for example, in U.S. Pat. No. 4,344,710 to Johnson et al., and in an article by L. M. Zwolinski and F. J. Dwyer, "Extruded Polystyrene Foam With CFC/Carbon Dioxide Blowing Agents," ANTEC '86, pages 30–33, Conference Proceedings, Society of Plastic Engineers 44th Annual Technical Conference and Exhibit. Because of the high volatility of carbon dioxide, it can only be substituted at a low level in the process. Thus, the use of carbon dioxide as a co-blowing agent with hydrocarbon or halocarbon blowing agents still results in a significant amount of process emission that is a source of pollution.

Therefore, a need exists for a foam process that reduces fugitive VOC emissions by reducing the concentration of the VOC blowing agent, while still producing a foam with desirable properties.

SUMMARY OF THE INVENTION

According to one method of producing an alkenyl aromatic polymer foam structure, at least one alkenyl aromatic polymer resin is melted. An effective amount of blowing agent mixture is dissolved in the at least one alkenyl aromatic polymer. The blowing agent mixture comprises at least one volatile organic compound (VOC) blowing agent and acetone. The majority by mole percent of the VOC blowing agent is selected from normal butane ("n-butane"), iso-butane ("i-butane"), propane and combinations thereof. An extrudate is formed comprising the at least one alkenyl aromatic polymer resin, the at least one VOC blowing agent, and acetone. The extrudate comprises less than about 2.7 wt. % of the at least one VOC blowing agent. The extrudate is transferred to an expansion zone and permitted to expand in the expansion zone to produce the alkenyl aromatic polymer foam structure. The alkenyl aromatic polymer foam structure has an extruded density less than about 7 lbs/ft$^3$ and a basis weight of less than about 20 grams per 100 in$^2$.

According to one embodiment, an alkenyl aromatic polymer foam structure is prepared by the process comprising melting at least one alkenyl aromatic polymer resin. An effective amount of blowing agent mixture is dissolved in the at least one alkenyl aromatic polymer. The blowing agent mixture comprises at least one volatile organic compound (VOC) blowing agent and acetone. The majority by mole percent of the VOC blowing agent is selected from n-butane, iso-butane, propane and combinations thereof. An extrudate is formed comprising the at least one alkenyl aromatic polymer resin, the at least one VOC blowing agent, and acetone. The extrudate comprises less than about 2.7 wt. % of the at least one VOC blowing agent. The extrudate is transferred to an expansion zone and permitted to expand in the expansion zone to produce the alkenyl aromatic polymer foam structure. The alkenyl aromatic polymer foam structure has an extruded density less than about 7 lbs/ft$^3$ and a basis weight of less than about 20 grams per 100 in$^2$.

According to another method of producing an alkenyl aromatic polymer foam structure, at least one alkenyl aromatic polymer resin is melted. An effective amount of blowing agent mixture is dissolved in the at least one alkenyl aromatic polymer. The blowing agent mixture consists essentially of at least one volatile organic compound (VOC) blowing agent and acetone. The VOC blowing agent is selected from n-butane, iso-butane, propane and combinations thereof. An extrudate is formed comprising the at least one alkenyl aromatic polymer resin, the at least one VOC blowing agent, and acetone. The extrudate comprises less than about 2.7 wt. % of the at least one VOC blowing agent. The extrudate is transferred to an expansion zone and permitted to expand in the expansion zone to produce the alkenyl aromatic polymer foam structure. The alkenyl aromatic polymer foam structure has an extruded density less than about 7 lbs/ft$^3$ and a basis weight of less than about 20 grams per 100 in$^2$.

According to a further method of producing an alkenyl aromatic polymer foam structure, at least one alkenyl aromatic polymer resin is melted. An effective amount of blowing agent mixture is dissolved in the at least one alkenyl aromatic polymer. The blowing agent mixture consists essentially of at least one volatile organic compound (VOC) blowing agent, acetone and carbon dioxide. The VOC blowing agent is selected from n-butane, iso-butane, propane and combinations thereof. An extrudate is formed comprising the at least one alkenyl aromatic polymer resin, the at least one VOC blowing agent, acetone and carbon dioxide. The extrudate comprises less than about 2.7 wt. % of the at least one VOC blowing agent. The extrudate is transferred to an expansion zone and permitted to expand in the expansion zone to produce the alkenyl aromatic polymer foam structure. The alkenyl aromatic polymer foam structure has an extruded density less than about 7 lbs/ft$^3$ and a basis weight of less than about 20 grams per 100 in$^2$.

According to a yet another method for producing an alkenyl aromatic polymer foam structure, at least one alkenyl aromatic polymer resin is melted. An effective amount of blowing agent mixture is dissolved in the at least one alkenyl aromatic polymer. The blowing agent mixture consists essentially of at least one volatile organic compound (VOC) blowing agent, acetone and carbon dioxide. The VOC blowing agent is selected from n-butane, iso-butane, propane and combinations thereof. An extrudate is formed comprising the at least one alkenyl aromatic polymer resin, the at least one VOC blowing agent, acetone and carbon dioxide. The extrudate comprises less than about 2.4 wt. % of the at least one VOC blowing agent. The extrudate is transferred to an expansion zone and permitted to expand in the expansion zone to produce the alkenyl aromatic polymer foam structure. The alkenyl aromatic polymer foam structure has an extruded density less than about 7 lbs/ft$^3$ and a basis weight of less than about 20 grams per 100 in$^2$.

According to one method of forming a thermoformed alkenyl aromatic polymer foam article, at least one alkenyl aromatic polymer resin is melted. An effective amount of blowing agent mixture is dissolved in the at least one alkenyl aromatic polymer. The blowing agent mixture consists essentially of at least one volatile organic compound (VOC) blowing agent and acetone. The majority by mole percent of the VOC blowing agent is selected from n-butane, iso-butane, propane and combinations thereof. An extrudate is formed comprising the at least one alkenyl aromatic polymer resin, the at least one VOC blowing agent, and acetone. The extrudate comprises less than about 2.7 wt. % of the at least one VOC blowing agent. The extrudate is transferred to an expansion zone and permitted to expand in the expansion zone to produce the alkenyl aromatic polymer foam structure. The alkenyl aromatic polymer foam structure has a basis weight of less than about 20 grams per 100 in$^2$. The alkenyl aromatic polymer foam structure is thermoformed into an article, the thermoformed density of the article is less than 6 lbs/ft$^3$.

Figure 1:
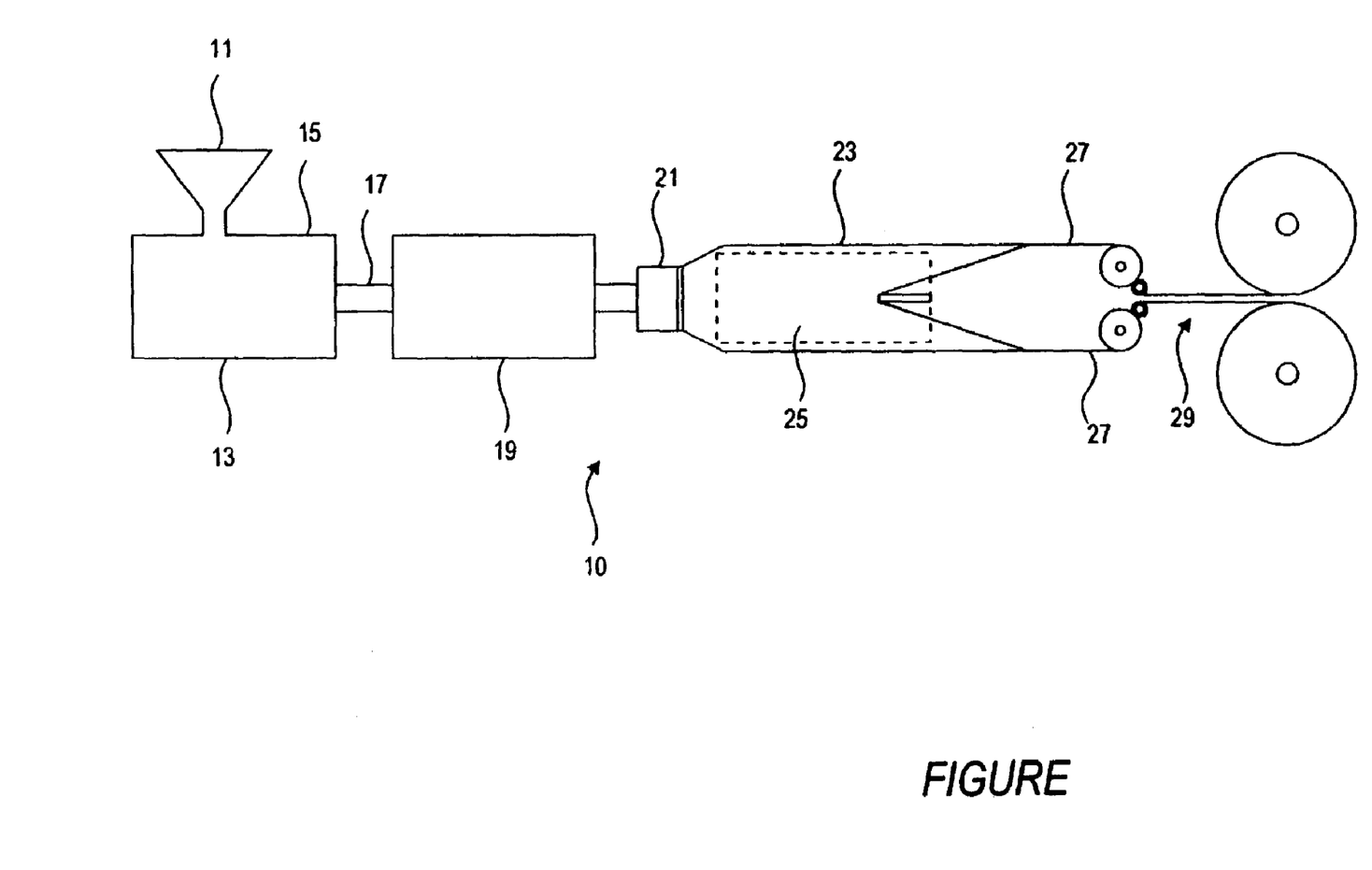
FIGURE is a schematic flow diagram of an overall sequence of operations involved in the manufacture of a foamed alkenyl aromatic polymer sheet with a blowing agent mixture according to one embodiment of the present invention.

While the invention is susceptible to various modifications and alternative forms, a specific embodiment thereof has been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DETAILED DESCRIPTION OF THE ILLUSTRATED EMBODIMENTS

The processes of the present invention that form an alkenyl aromatic polymer foam structure (e.g., polystyrene foam) employ a blowing agent mixture to achieve reduced fugitive VOC emissions. According to one method, the blowing agent mixture of the present invention comprises at least one volatile organic compound (VOC) blowing agent and acetone. The VOC blowing agent is selected from n-butane, iso-butane, propane and combinations thereof. The extrudate that is formed from at least one alkenyl aromatic polymer (e.g., polystyrene), the at least one VOC blowing agent, and acetone comprises less than about 2.7 wt. % of the at least one VOC blowing agent and is in substantial absence of VOC blowing agents having at least five carbon atoms.

Alkenyl Aromatic Polymer

The term "alkenyl aromatic polymer" as used herein includes polymers of aromatic hydrocarbon molecules that contain an aryl group joined to a olefinic group with only double bonds in the linear structure, such as styrene, α-methylstyrene, o-, m- and p-methylstyrene, α-ethylstyrene, o-, m-, p-ethylstyrene, 2,4-dimethylstyrene, α-vinylxylene, vinyl toluene and the like. Alkenyl aromatic polymers also include homopolymers of styrene (commonly referred to as polystyrene), copolymers of styrene (e.g., styrene-acrynitrile copolymers, SAN), and rubber-toughened polystyrene (commonly referred to as high impact polystyrene, HIPS).

The term "polystyrene resin" or "polystyrenic resin" as used herein includes styrene homopolymers and copolymers containing a predominant portion of styrene, i.e., greater than about 50 mol. % styrene, are preferred, with those containing greater than about 75 mol. % styrene being especially preferred. With respect to a styrene copolymer, the comonomer may be any other ethylenically unsaturated material such as the conjugated 1,3-dienes, e.g., butadiene, isoprene, etc., alpha-beta-unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc.

The term "polystyrene resin" as used herein also includes blends of at least 50 mol. % of the styrene homopolymer with another predominately styrenic copolymer. The physical blends are combined in dry form after the blends have previously been polymerized. The term "polystyrene resin" as used herein also includes blends of at least 50 mol. % (preferably at least 75 mol. %) of a styrene homopolymer and/or copolymer with other polymers. For example, blends of a styrene polymer with polyphenylene oxide. Other contemplated blends include a polystyrene resin with a small amount of polyolefin (e.g., less than about 2 wt. % polyolefin).

Blowing Agent Mixture

According to one method, the blowing agent mixture or blend of the present invention comprises at least one volatile organic compound (VOC) blowing agent and acetone. The majority of the VOC blowing agent by mole percent is selected from n-butane, iso-butane, propane and combinations thereof. It is preferable that the VOC blowing agent mixture is made in substantial absence of VOC blowing agents having at least five carbon atoms and preferably made in the absence of VOC blowing agents having at least five carbon atoms. The extrudate that is formed in the present invention from at least one alkenyl aromatic polymer, the at least one VOC blowing agent, and acetone comprises less than about 2.7 wt. % VOC blowing agent.

It is contemplated that the blowing agent mixture of the present invention may further comprise carbon dioxide ($CO_2$). In one embodiment of the present invention, carbon dioxide is in the liquid state before injection into the extruder. Carbon dioxide in gaseous state or supercritical fluid state may, however, also be used in the present invention. It is desirable to add carbon dioxide because of its high foaming potential. Only limited amounts of carbon dioxide, however, are introduced so as to prevent or inhibit uncontrollable foaming, formation of poor quality products (e.g., products with excessive and unwanted corrugation), and/or significant loss of equipment productivity. It is desirable that if carbon dioxide is used, then it is maintained at a certain amount in the system to achieve better final sheet density control.

It is contemplated that other non-VOC blowing agents such as methyl acetate and/or water may be added to the blowing agent mixture of the present invention.

The blowing agent mixture of the present invention preferably consists essentially of at least one VOC blowing agent (n-butane, iso-butane, propane and combinations thereof), acetone and carbon dioxide. The blowing agent mixture of the present invention more preferably consists of at least one VOC blowing agent (n-butane, iso-butane, propane and combinations thereof), acetone and carbon dioxide.

The extrudate that is formed from at least one alkenyl aromatic polymer, the at least one VOC blowing agent, and acetone comprises less than about 2.7 wt. % VOC blowing agent. The extrudate generally comprises less than about 2.4 wt. % VOC blowing agent and typically comprises from about 2.0 to about 2.4 wt. % of the VOC blowing agent. The extrudate generally comprises from about 0.5 to about 2.0 wt. % acetone and, more specifically, from about 0.8 to about 1.8 wt. % acetone. In one embodiment, the extrudate comprises from about 2.0 to about 2.4 wt. % VOC blowing agent, from about 0.5 to about 2.0 wt. % acetone, and from about 0.3 to about 1.0 wt. % carbon dioxide.

The total amount of the blowing agent mixture used depends on conditions such as extrusion-process conditions at mixing, the blowing agent mixture being used, the composition of the extrudate, and the desired density of the foamed article. The extrudate is defined herein as including the blowing agent mixture, at least one alkenyl aromatic polymer, and any additives. For a foam sheet having an extruded density of from about 2 to about 7 lbs/ft$^3$, the extrudate typically comprises from about 7 to about 3 wt. % of the blowing agent mixture. The extrudate more typically comprises from about 6 to about 3.5 wt. % of the blowing agent mixture.

Other Additives

A nucleating agent or combination of such agents may be employed in the present invention for advantages, such as its capability for regulating cell formation and morphology. A nucleating agent, or cell size control agent, may be any conventional or useful nucleating agent(s). The amount of nucleating agent used depends upon the desired cell size, the selected blowing agent mixture, and the desired foam density. The nucleating agent is generally added in amounts from about 0.1 to about 2.0 wt. % of the alkenyl aromatic polymer composition.

Some contemplated nucleating agents include inorganic materials (in small particulate form), such as clay, talc, silica, and diatomaceous earth. Other contemplated nucleating agents include organic nucleating agents that decompose or react at the heating temperature within an extruder to evolve gases such as carbon dioxide and/or nitrogen. It is contemplated that mixtures of different nucleating agents may be added in the present invention. Some more desirable nucleating agents include talc, crystalline silica, and a stoichiometric mixture of citric acid and sodium bicarbonate (the stoichiometric mixture having a 1 to 100 percent concentration where the carrier is a suitable polymer such as polystyrene). Talc may be added in a carrier or in a powder form.

If desired, fillers, colorants, light and heat stabilizers, anti-oxidants, acid scavengers, flame retardants, processing aids, extrusion aids and foaming additives may be used in making the alkenyl aromatic polymer foam.

Processes

A conventional two-extruder tandem system with each extruder having a single screw may be used for extruding the foam article of the present invention. Alternatively, a two-extruder tandem system in which the primary extruder is a twin screw, and the secondary extruder is a single screw may be used for extruding the foam article of the present invention. A single extruder with proper cooling may also be employed in the present invention.

According to one process of the present invention, alkenyl aromatic polymer (e.g., polystyrene resin) pellets are admixed with a nucleating agent, such as talc. These materials are continuously fed into a hopper of an extruder. The feed mixture is conveyed forward by a screw within a barrel of the extruder as the mixture is mixed, compressed, heated, and converted to molten form. The conversion to molten form occurs prior to reaching the injection zone where the blowing agent mixture of at least one VOC blowing agent (n-butane, iso-butane, propane and combinations thereof) and acetone is added. The blowing agent mixture of the present invention may be injected into the polystyrene composition at a point where the polystyrene is in a melt state (i.e., beyond the feed zone).

After injecting the blowing agent mixture, the blowing agent mixture and the at least one polystyrene resin is continuously mixed at pressures to ensure a homogeneous solution of the resin and the blowing agent mixture. The molten mixture is then conveyed into a cooling zone where additional mixing takes place. The mixture is then extruded through a die into a lower pressure zone, such as atmospheric pressure.

According to one embodiment, a two-extruder tandem system 10 of the FIGURE may be used for extruding an alkenyl aromatic polymer foam article (e.g., a polystyrene foam article) of the present invention. Polystyrene resin pellets are mixed with at least one additive (e.g., a nucleating agent) to form a feed mixture which is fed continuously into a hopper 11 of a primary extruder 13. The feed mixture is conveyed forward by a helical screw within a barrel of the extruder as the feed mixture is mixed, compressed, heated and melted prior to reaching the blowing-agent-injection zone. The blowing agent mixture is added at point 15. Thus, the blowing agent mixture of the present invention is injected into the polystyrene/additives mixture (feed mixture) at a point beyond the feed zone where the polystyrene is melted. It is contemplated that the blowing agent mixture may be injected at other locations, including a secondary extruder.

Following injection of the blowing agent mixture, the mixture is continuously mixed in the primary extruder 13. The exit pressure of the primary extruder 13 is generally from about 2,000 to about 5,000 psi. The temperature of the primary extruder 13 is generally from about 420 to about 500° F. The mixture is subsequently passed, at a high enough pressure that the blowing agent mixture remains in solution, through a hollow adapter section 17 into a cooled secondary tandem extruder 19. The molten mixture is passed along the length of the cooled secondary extruder at low shear where cooling and additional mixing occur. The extruder exit pressure of the secondary extruder 19 is generally from about 1,500 to about 3,500 psi. The temperature of the extrudate from the secondary extruder 19 is generally from about 250 to about 340° F.

In general, the temperature of the primary extruder should be sufficient to melt the polystyrene resin and any additives, and to promote efficient mixing. The temperature and pressure in the secondary extruder should be sufficient to keep the polystyrene resin and the blowing agent mixture as a homogeneous solution. The mixture is then expressed through an annular die 21, though a die of a different configuration, such as a flat die, may also be used. The foamable polystyrene resin is extruded through the annular die 21 in the form of an elongated bubble or tube 23. The foamable polystyrene resin in the FIGURE is expanded and drawn over a cylindrical surface of a cooling and sizing drum 25, and slit to form sheet stock 27. The sheet stock 27 is taken up on one or more winding reels 29.

Foamed Product

The alkenyl aromatic polymer (e.g., polystyrene) foam structure of the present invention has an extruded density less than about 7 lbs/ft$^3$ and a basis weight of less than about 20 grams per 100 in$^2$. The alkenyl aromatic polymer (e.g., polystyrene) foam structure typically has an extruded density of from about 3 to about 7 lbs/ft$^3$. The alkenyl aromatic polymer foam structure of the present invention more typically has a basis weight of less than about 15 grams per 100 in$^2$. More specifically, the alkenyl aromatic polymer foam structure of the present invention has a basis weight of from about 6 to about 18 grams per 100 in$^2$. The alkenyl aromatic polymer foam structure generally has a thermoformed density of from about 1 to about 6 lbs/ft$^3$ and, more typically, from about 1.5 to about 4 lbs/ft$^3$.

It is also highly desirable for the alkenyl aromatic polymer foam structures to be "dimensionally stable" in the short term. Dimensionally stable as defined herein is when the gauge of the foam does not deviate more than about 15% (i.e., the foam does not either shrink more than about 15% or expand more than about 15%) from the gauge of the alkenyl aromatic polymer foam at the time of the production. The initial extruded gauge of the alkenyl aromatic polymer foam at the time of the production refers to its gauge at about 5 minutes after the foam exits the die. This measurement is used in determining the initial extruded gauge of the foam. To have a dimensionally stable product, the gauge of the alkenyl aromatic polymer foam is then typically measured after about 30 to 45 minutes (referred to as aged gauge) and compared to its initial extruded gauge. It is desirable that the aged gauge of the foam does not deviate more than about 10% from its initial extruded gauge. If the foam does not have short-term dimensional stability, then the alkenyl aromatic polymeric sheet may have difficulties in winding upon itself.

It is desirable to produce a alkenyl aromatic polymer foam that will not reduce equipment productivity or affect the quality of the product (e.g., minimized or no corrugation). The alkenyl aromatic polymer foam structures may be used for a variety of applications, including supermarket trays, fast food containers, bowls and plates.

EXAMPLES

Various blowing agents and blowing agent mixtures were tested with the results shown below in Table 1. Specifically, several foams were made from comparative blowing agents or comparative blowing agent mixtures, and inventive blowing agent mixtures. It should be noted that in the various examples reported in Table 1, the hardware was the same and operated in exactly the same way; the only variable was the blowing agent or blowing agent mixture, except as noted in the description below. All of the inventive blowing agent mixtures consisted of (a) iso-butane ("i-butane") and acetone, (b) iso-butane, acetone and carbon dioxide, (c) n-butane and acetone, or (d) n-butane, acetone and carbon dioxide. The comparative blowing agents or comparative blowing agent mixtures consisted of (a) iso-pentane ("i-pentane") and carbon dioxide, (b) iso-pentane, carbon dioxide and acetone, (c) n-butane, or (d) n-butane of 3.73 wt. % of the extrudate, carbon dioxide and acetone.

Each of the foams was made of polystyrene on a tandem extrusion line employing 2.5 inch and 3.5 inch single-screw extruders and used one port in the primary extruder for injecting compressed fluids. The polystyrene resin was 50 wt. % of Dow's general purpose polystyrene STYRON™ 685D resin and 50 wt. % reclaimed polystyrene that was derived from Dow's STYRON™ 685D resin. The reclaimed material also included talc. In addition to the blowing agent or blowing agent mixture, and the polystyrene mixture, talc was added in varying amounts (0.4 to 1.8 wt. %) to make the foams.

The polystyrene resin was introduced along with the talc (nucleating agent) at the feed throat of the primary extruder where it was melted and pressurized to between 2300 psi and 3890 psi at a temperature of approximately 465° F. The blowing agent mixture was introduced into the melt after a first metering zone of the primary extruder where it was thoroughly mixed with the melt and conveyed to the secondary extruder. The secondary extruder cooled the melt to between 279° F. and 305° F. at an exit pressure of between 1220 psi and 1760 psi, and conveyed the melt to an annular die.

The extruded foam tube was stabilized over a mandrel, and then slit to form a sheet. The extruded polystyrene foam sheets were wound up into rolls after determining their extruded sheet basis weight, extruded sheet density, initial extruded gauge and gauge loss after 30 or 45 minutes. The density was measured in accordance with an ASTM D 1622-98. The gauge loss was determined by the following equation: (gauge$_{initial}$−gauge$_{aged}$)/(gauge$_{initial}$), wherein the "gauge initial" is the first measured gauge after about 5 minutes and the "aged gauge" is the second measured gauge after about 30 to 45 minutes. The extruded polystyrene foam sheets had lower basis weights that ranged from 8.9 to 10 g/100 in$^2$ (Comparative Examples 3–6, 18, and 19, and Inventive Examples 7–9 and 20). The extruded polystyrene foam sheets also had higher basis weights that ranged from 14.6 to 15 g/100 in$^2$ (Comparative Examples 1, 2, and 12, and Inventive Examples 10, 11, and 13–17).

For Comparative Examples 1–6, the sheets of polystyrene were formed into a roll and allowed to age at room temperature for a duration of 3 to 7 days. After aging, the polystyrene foam sheets were thermoformed into supermarket trays. Various properties of the supermarket trays were determined 7 days after being thermoformed. These determined properties included their thermoformed part density, part basis weight, flexural rigidity, and flexural rigidity to basis weight ratio. The flexural rigidity of all of the examples was determined in accordance with Gibson, Lorna J. and Ashby, Michael F., "Cellular Solids; Structure and Properties", Cambridge University Press, Second Edition, 1997, page 372, ISBN 0 52149911 9.

For Inventive Examples 7–9, 13, 14 and 20, and Comparative Examples 12, 18 and 19, the polystyrene foam sheets were formed into a roll and allowed to age at room temperature for a duration of 3 to 7 days. After aging, the polystyrene foam sheets were thermoformed into supermarket trays. Various properties of the supermarket trays were determined 7 to 14 days after being thermoformed. These determined properties included their thermoformed part density, part basis weight, flexural rigidity, and flexural rigidity to basis weight ratio.

For Inventive Examples 10, 11, and 15–17, the foam sheets of polystyrene were formed into a roll and allowed to age at room temperature for a duration of 32 to 35 days. After aging, the polystyrene foam sheets were thermoformed into supermarket trays. Various properties of the supermarket trays were determined seven days after being thermoformed. These determined properties included their thermoformed part density, part basis weight, flexural rigidity, and flexural rigidity to basis weight ratio.

TABLE 1

| Examples | VOC Blowing Agent (BA) | VOC BA (wt. %) | $CO_2$ (wt. %) | Acetone (wt. %) | Extruded Sheet Basis Weight (g/100 in$^2$) | Extruded Sheet Density (lbs/ft$^3$) |
|---|---|---|---|---|---|---|
| Comparative Ex 1 | i-pentane[b] | 4.20 | 0.55 | 0 | 14.7 | 4.11 |
| Comparative Ex 2 | i-pentane | 3.30 | 0.54 | 0.82 | 14.4 | 4.15 |
| Comparative Ex 3 | i-pentane | 4.78 | 0.49 | 0 | 8.9 | 3.84 |
| Comparative Ex 4 | i-pentane | 3.85 | 0.63 | 0.96 | 9.2 | 3.93 |
| Comparative Ex 5 | i-pentane | 2.26 | 0.63 | 1.56 | 9.9 | 5.79 |
| Comparative Ex 6 | i-pentane | 1.75 | 0.69 | 2.03 | 10.0 | 5.59 |
| Inventive Ex 7 | i-Butane[c] | 2.62 | 0.69 | 1.80 | 9.2 | 3.72 |
| Inventive Ex 8 | i-Butane | 2.30 | 0.61 | 0.73 | 9.9 | 4.76 |
| Inventive Ex 9 | i-Butane | 1.94 | 0.76 | 1.08 | 9.8 | 4.66 |
| Inventive Ex 10 | i-Butane | 2.11 | 0 | 1.78 | 14.8 | 5.62 |
| Inventive Ex 11 | i-Butane | 2.18 | 0.48 | 1.83 | 15.0 | 3.88 |
| Comparative Ex 12 | n-Butane | 3.76 | 0 | 0 | 14.6 | 3.96 |
| Inventive Ex 13 | n-Butane | 2.75 | 0 | 0.88 | 14.7 | 4.33 |
| Inventive Ex 14 | n-Butane | 2.70 | 0.32 | 0.92 | 14.6 | 3.88 |
| Inventive Ex 15 | n-Butane | 2.15 | 0 | 1.80 | 14.7 | 4.90 |
| Inventive Ex 16 | n-Butane | 2.15 | 0.40 | 1.78 | 14.7 | 4.05 |
| Inventive Ex 17 | n-Butane | 2.01 | 0.68 | 1.36 | 15.0 | 3.88 |
| Comparative Ex 18 | n-Butane | 5.02 | 0 | 0 | 9.4 | 3.10 |
| Comparative Ex 19 | n-Butane | 3.73 | 0.43 | 1.27 | 8.9 | 3.13 |
| Inventive Ex 20 | n-Butane | 2.48 | 0.68 | 1.65 | 9.0 | 3.60 |

| Examples | Initial Extruded Gauge (mils) | Gauge Loss after 45 min. (%) | Thermoformed part density (lbs/ft$^3$) | Part Basis Weight (BW) (g/100 in$^2$) | Flexural Rigidity (lbs. in$^2$) | Flex Rigidity to BW ratio |
|---|---|---|---|---|---|---|
| Comparative Ex 1 | 136 | <2%[a] | 2.14 | 12.7 | 4.42 | 0.35 |
| Comparative Ex 2 | 132 | <2%[a] | 2.21 | 12.7 | 3.94 | 0.31 |
| Comparative Ex 3 | 88 | 2% | 1.78 | 8.1 | 1.73 | 0.21 |
| Comparative Ex 4 | 89 | 6% | 1.68 | 7.7 | 1.98 | 0.26 |
| Comparative Ex 5 | 65 | 19% | 2.70 | 9.0 | 1.52 | 0.17 |
| Comparative Ex 6 | 68 | 18% | 2.73 | 9.2 | 1.47 | 0.16 |
| Inventive Ex 7 | 94 | 1% | 1.91 | 8.5 | 2.23 | 0.26 |
| Inventive | 79 | 2% | 2.66 | 9.0 | 1.51 | 0.17 |

TABLE 1-continued

| | | | | | | |
|---|---|---|---|---|---|---|
| Ex 8 Inventive | 80 | 6% | 2.43 | 8.8 | 1.61 | 0.18 |
| Ex 9 Inventive | 100 | 0%[a] | 2.50 | 14.4 | 5.99 | 0.42 |
| Ex 10 Inventive | 147 | 0%[a] | 2.00 | 14.7 | 7.85 | 0.53 |
| Ex 11 Comparative | 140 | 0%[a] | 1.50 | 12.2 | 5.70 | 0.47 |
| Ex 12 Inventive | 129 | 0%[a] | 1.55 | 12.6 | 5.87 | 0.47 |
| Ex 13 Inventive | 143 | 0%[a] | 1.47 | 12.0 | 6.24 | 0.52 |
| Ex 14 Inventive | 114 | 0%[a] | 2.37 | 12.7 | 5.09 | 0.40 |
| Ex 15 Inventive | 138 | 0%[a] | 2.17 | 13.2 | 5.87 | 0.44 |
| Ex 16 Inventive | 147 | 0%[a] | 1.83 | 13.1 | 7.04 | 0.54 |
| Ex 17 Comparative | 115 | 0% | 1.42 | 7.6 | 2.12 | 0.28 |
| Ex 18 Comparative | 108 | 2% | 1.51 | 7.5 | 2.05 | 0.27 |
| Ex 19 Inventive | 95 | 3% | 2.18 | 9.2 | 2.60 | 0.28 |
| Ex 20 | | | | | | |

[a]gauge loss 30 minutes after extrusion.
[b]i-pentane = iso-pentane
[c]i-butane = iso-butane As shown in Table 1, when the blowing agent mixture included iso-pentane as the sole VOC blowing agent (see Comparative Examples 1–6), the resulting foam was not dimensionally stable at lower weight percentages of iso-pentane. Compare Comparative Examples 5 and 6 (2.26 and 1.75 wt. % iso-pentane with gauge losses of 19 and 18%, respectively) with Comparative Examples 1–4 (between 3.30 and 4.78 wt. % iso-pentane with gauge losses below 6%). Thus, as shown in Comparative Examples 1–6, when the iso-pentane of the blowing agent mixture was replaced by an increased amount of acetone, the extruded polystyrene foam sheet became more susceptible to short term dimensional stability problems (reduction of the sheet thickness after extrusion). This was especially prevalent at lower extruded sheet basis weights (8.9–10.0 g/100 in²) of Comparative Examples 3–6.

This, however, was not the case using a blowing agent mixture that comprised iso-butane or n-butane with at least acetone. As shown in Inventive Examples 7–11, a blowing agent mixture comprising from 1.94 to 2.62 wt. % iso-butane with at least acetone surprisingly produced gauge losses of only from between 0 and 6%. The highest gauge loss of Inventive Examples 7–11 (6% in Inventive Example 9) was formed using a blowing agent mixture comprising 1.94 wt. % iso-butane, which was lower than the iso-butane used in the blowing agent mixtures of Inventive Examples 7, 8, 10, and 11. Similarly, as shown in Inventive Examples 13–17 and 20, a blowing agent mixture comprising from 2.01 to 2.75 wt. % n-butane with at least acetone surprisingly produced gauge losses of only from between 0 and 3%. Additionally, the Inventive Examples did not sacrifice flexural rigidity when compared to the Comparative Examples.

Thus, Table 1 shows that when the comparative blowing agent mixtures comprised of at least iso-pentane and acetone are compared to the inventive blowing agent mixtures comprised of at least either (a) iso-butane and acetone or (b) n-butane and acetone at lower VOC weight percentages, the dimensional stability of the inventive foams is unexpectedly much improved than the comparative foams at similarly lower VOC weight percentages.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method for producing an alkenyl aromatic polymer foam structure comprising:
    melting at least one alkenyl aromatic polymer resin;
    dissolving a blowing agent mixture in the at least one alkenyl aromatic polymer resin, wherein the blowing agent mixture is less than about 4.5 wt. % based on a total mixture of the at least one alkenyl aromatic polymer resin and the blowing agent mixture and wherein the blowing agent mixture comprises at least one volatile organic compound (VOC) blowing agent and acetone, the VOC blowing agent being selected from the group consisting of n-butane, propane and combinations thereof;
    forming an extrudate comprising the at least one alkenyl aromatic polymer resin, the at least one VOC blowing agent, and acetone, the extrudate comprising less than about 2.7 wt. % of the at least one VOC blowing agent; and
    permitting the extrudate to expand to produce the alkenyl aromatic polymer foam structure, the alkenyl aromatic polymer foam structure having an extruded density less than about 7 lbs/ft³ and a basis weight of less than about 20 grams per 100 in².

2. The method of claim 1, wherein the extrudate comprises less than about 2.4 wt. % VOC blowing agent.

3. The method of claim 2, wherein the extrudate comprises from about 2.0 to about 2.4 wt. % VOC blowing agent.

4. The method of claim 1, wherein the extrudate comprises from about 0.5 to about 2.0 wt. % acetone.

5. The method of claim 4, wherein the extrudate comprises from about 0.8 to about 1.8 wt. % acetone.

6. The method of claim 1, wherein the extrudate comprises from about 3 to about 4.5 wt. % of the blowing agent mixture.

7. The method of claim 1, wherein the alkenyl aromatic polymer foam structure has an extruded density of from about 3 to about 7 lbs/ft$^3$.

8. The method of claim 1, wherein the at least one alkenyl aromatic polymer foam structure is a homopolymer of styrene, copolymers of styrene, or rubber-toughened polystyrene.

9. The method of claim 1, wherein the polystyrene foam structure has a basis weight of less than about 15 grams per 100 in$^2$.

10. The method of claim 1 further including thermoforming the alkenyl aromatic polymer foam structure into an article, the thermoformed density of the article being less than 6 lbs/ft$^3$.

11. The method of claim 10, wherein the thermoformed article is a homopolymer of styrene, copolymers of styrene, or rubber-toughened polystyrene.

12. The method of claim 1, wherein the blowing agent mixture is from about 3.6 wt. % to about 4.3 wt. % based the total mixture of the at least one alkenyl aromatic polymer and the blowing agent mixture.

13. The method of claim 12, wherein the blowing agent mixture is less than about 4.0 wt. % based the total mixture of the at least one alkenyl aromatic polymer and the blowing agent mixture.

14. The method of claim 1, wherein the blowing agent mixture further comprises carbon dioxide.

15. The method of claim 1, wherein the blowing agent mixture further comprises methyl acetate and/or water.

16. The method of claim 14, wherein the extrudate further comprises from about 0.3 to about 1.0 wt. % carbon dioxide.

17. The method of claim 7, wherein the alkenyl aromatic polymer foam structure has an extruded density of at least 3.8 lbs/ft$^3$.

18. A method for producing an alkenyl aromatic polymer foam structure comprising:
melting at least one alkenyl aromatic polymer resin;
dissolving a blowing agent mixture in the at least one alkenyl aromatic polymer resin, wherein the blowing agent mixture is less than about 4.5 wt. % based on a total mixture of the at least one alkenyl aromatic polymer resin and the blowing agent mixture and wherein the blowing agent mixture consists essentially of at least one volatile organic compound (VOC) blowing agent, acetone, and at least one non-VOC blowing agent, the VOC blowing agent being selected from the group consisting of n-butane, propane and combinations thereof and the non-VOC blowing agent being selected from the group consisting of carbon dioxide, methyl acetate, water and combinations thereof;
forming an extrudate comprising the at least one alkenyl aromatic polymer resin, the at least one VOC blowing agent, and acetone, the extrudate comprising less than about 2.7 wt. % of the at least one VOC blowing agent; and
permitting the extrudate to expand to produce the alkenyl aromatic polymer foam structure, the alkenyl aromatic polymer foam structure having an extruded density less than about 7 lbs/ft$^3$ and a basis weight of less than about 20 grams per 100 in$^2$.

19. The method of claim 18, wherein the extrudate comprises less than about 2.4 wt. % VOC blowing agent.

20. The method of claim 18, wherein the extrudate comprises from about 2.0 to about 2.4 wt. % VOC blowing agent.

21. The method of claim 18, wherein the extrudate comprises from about 0.5 to about 2.0 wt. % acetone.

22. The method of claim 18, wherein the at least one alkenyl aromatic polymer foam structure is a homopolymer of styrene, copolymers of styrene, or rubber-toughened polystyrene.

23. The method of claim 18, further including thermoforming the alkenyl aromatic polymer foam structure into an article, the thermoformed density of the article being less than 6 lbs/ft$^3$.

24. The method of claim 23, wherein the thermoformed article is a homopolymer of styrene, copolymers of styrene, or rubber-toughened polystyrene.

25. The method of claim 18, wherein the blowing agent mixture is from about 3.6 wt. % to about 4.3 wt. % based on the total mixture of the at least one alkenyl aromatic polymer and the blowing agent mixture.

26. The method of claim 25, wherein the blowing agent mixture is less than about 4.0 wt. % based the total mixture of the at least one alkenyl aromatic polymer and the blowing agent mixture.

27. A method for producing an alkenyl aromatic polymer foam structure comprising:
melting at least one alkenyl aromatic polymer resin;
dissolving a blowing agent mixture in the at least one alkenyl aromatic polymer resin, wherein the blowing agent mixture is less than about 4.5 wt. % based on a total mixture of the at least one alkenyl aromatic polymer resin and the blowing agent mixture and wherein the blowing agent mixture consists essentially of at least one volatile organic compound (VOC) blowing agent, acetone and carbon dioxide, the VOC blowing agent being selected from the group consisting of n-butane, propane and combinations thereof;
forming an extrudate comprising the at least one alkenyl aromatic polymer resin, the at least one VOC blowing agent, acetone and carbon dioxide, the extrudate comprising less than about 2.7 wt. % of the at least one VOC blowing agent; and
permitting the extrudate to expand to produce the alkenyl aromatic polymer foam structure, the alkenyl aromatic polymer foam structure having an extruded density less than about 7 lbs/ft$^3$ and a basis weight of less than about 20 grams per 100 in$^2$.

28. The method of claim 27, wherein the extrudate comprises less than about 2.4 wt. % VOC blowing agent.

29. The method of claim 27, wherein the extrudate comprises from about 2.0 to about 2.4 wt. % VOC blowing agent.

30. The method of claim 27, wherein the extrudate comprises from about 0.5 to about 2.0 wt. % acetone.

31. The method of claim 27, wherein the at least one alkenyl aromatic polymer foam structure is a homopolymer of styrene, copolymers of styrene, or rubber-toughened polystyrene.

32. The method of claim 27, further including thermoforming the alkenyl aromatic polymer foam structure into an article, the thermoformed density of the article being less than 6 lbs/ft$^3$.

33. The method of claim 32, wherein the thermoformed article is a homopolymer of styrene, copolymers of styrene, or rubber-toughened polystyrene.

34. The method of claim 27, wherein the extrudate consists essentially of from about 2.0 to about 2.4 wt. % VOC blowing agent, from about 0.5 to about 2.0 wt. % acetone, and from about 0.3 to about 1.0 wt. % carbon dioxide.

35. The method of claim 27, wherein the blowing agent mixture is from about 3.6 wt. % to about 4.3 wt. % based on the total mixture of the at least one alkenyl aromatic polymer and the blowing agent mixture.

36. A method for producing an alkenyl aromatic polymer foam structure comprising:
melting at least one alkenyl aromatic polymer resin;
dissolving an effective amount of a blowing agent mixture in the at least one alkenyl aromatic polymer, wherein the blowing agent mixture consists essentially of at least one volatile organic compound (VOC) blowing agent and acetone, the VOC blowing agent being selected from the group consisting of n-butane, propane and combinations thereof;
forming an extrudate comprising the at least one alkenyl aromatic polymer resin, the at least one VOC blowing agent and acetone, the extrudate comprising less than about 2.7 wt. % of the at least one VOC blowing agent; and
permitting the extrudate to expand to produce the alkenyl aromatic polymer foam structure, the alkenyl aromatic polymer foam structure having an extruded density less than about 7 lbs/ft$^3$ and a basis weight of less than about 20 grams per 100 in$^2$.

37. The method of claim 36, wherein the extrudate comprises from about 2.0 to about 2.4 wt. % VOC blowing agent.

38. The method of claim 36, wherein the extrudate comprises from about 0.5 to about 2.0 wt. % acetone.

39. The method of claim 36, wherein the at least one alkenyl aromatic polymer foam structure is a homopolymer of styrene, copolymers of styrene, or rubber-toughened polystyrene.

40. The method of claim 36, further including thermoforming the alkenyl aromatic polymer foam structure into an article, the thermoformed density of the article being less than 6 lbs/ft$^3$.

41. The method of claim 40, wherein the thermoformed article is a homopolymer of styrene, copolymers of styrene, or rubber-toughened polystyrene.

42. The method of claim 36, wherein the extrudate comprises less than about 2.4 wt. % VOC blowing agent.

* * * * *